(No Model.)
G. THOMPSON.
HARNESS.
No. 291,812. Patented Jan. 8, 1884.
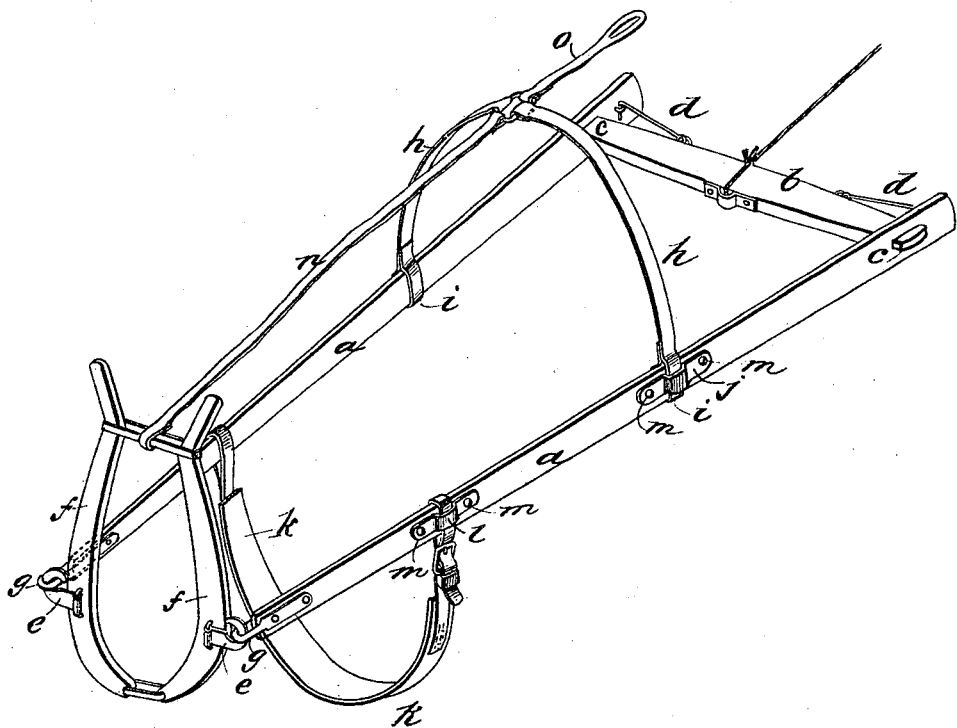
WITNESSES:
Francis McArdle
C. Sedgwick
INVENTOR:
G. Thompson
BY
ATTORNEYS.

UNITED STATES PATENT OFFICE.

GREEN THOMPSON, OF NEW SALEM, INDIANA.

HARNESS.

SPECIFICATION forming part of Letters Patent No. 291,812, dated January 8, 1884.

Application filed October 23, 1883. (No model.)

*To all whom it may concern:*

Be it known that I, GREEN THOMPSON, of New Salem, in the county of Rush and State of Indiana, have invented a new and Improved Harness, of which the following is a full, clear, and exact description.

The object of the invention is to improve that class of harness employed in working hay-carriers and hoisting-gear, as hereinafter described, and pointed out in the claims.

Reference is to be had to the accompanying drawing, forming part of this specification, in which the figure is a perspective view of my improved harness.

Instead of using leather traces, I employ two thin and light bars, a, of strong wood, to which I connect the whiffletree b at their rear ends, preferably by inserting the ends c in mortises of the bars, and securing them detachably by hooks d, and I connect the front ends of bars a to the hooks e of the hames f by suitable eye-straps or yokes, g, and I suspend the bars from the hips of the horse by the hip-straps h, which I buckle around the bars at i, and secure in position by leather loops j. I also employ a belly-band, k, buckling it around the bars, and securing it in the proper place by the leather loops l, and I connect these loops j and l to bars a by wood-screws m, that may be readily taken out and put in again, to facilitate the shifting of the hip-straps and the belly-band along the bars to suit horses of different sizes. A backing-band may be employed, if preferred; but it is not essential. The back-strap n, to which the hip-straps h and also the crupper o are attached, may have a loop and buckle, as in other harness, for adjusting it to the size of the horse.

It will be seen that with this improved rigid-bar-trace harness for working hay-forks and the like hoisting apparatus, the trouble with the falling of the whiffletree will be wholly avoided. While wood is undoubtedly the best material for such rigid traces, I may, of course, use metal or other suitable material. The wood traces will be strengthened at the ends having the mortises by rivets suitably inserted, and the belly-band k will be made wider than ordinary, in consequence of the upward thrust caused on it by the weight of the hind part and the downdraft of the rope.

Having thus described my invention, what I claim as new, and desire to secure by Letters Patent, is—

1. The back-strap n, combined in front with the cross-strap which connects the upper ends of the hames, as shown and described.

2. The back-strap n, connected to the cross-strap of the hames, in combination with the hip-straps h h and bars a a, substantially as and for the purpose set forth.

GREEN THOMPSON.

Witnesses:
JAMES L. SMITH,
MILTON C. CARR.